United States Patent
Suzuki et al.

(10) Patent No.: US 6,984,041 B2
(45) Date of Patent: Jan. 10, 2006

(54) COLOR-SEPARATING AND -RECOMBINING OPTICAL SYSTEM

(75) Inventors: Tetsuji Suzuki, Yokosuka (JP); Tsutou Asakura, Odawara (JP); Shogo Masuda, Hachioji (JP); Terumi Ohara, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 14 days.

(21) Appl. No.: 10/693,969

(22) Filed: Oct. 28, 2003

(65) Prior Publication Data

US 2004/0085518 A1 May 6, 2004

(30) Foreign Application Priority Data

Oct. 31, 2002 (JP) ...................... 2002-317315

(51) Int. Cl.
*G03B 21/00* (2006.01)
*G03B 21/14* (2006.01)
*G02B 27/10* (2006.01)
*G02F 1/1335* (2006.01)
*G02F 1/00* (2006.01)

(52) U.S. Cl. .............................. 353/33; 353/20; 353/34; 353/37; 353/81; 353/82; 359/496; 359/586; 359/625; 359/638; 359/640; 348/750; 348/757; 349/9; 349/25

(58) Field of Classification Search ................. 353/31, 353/20, 30, 33, 34, 37, 38, 81, 82; 359/245–247, 359/255, 281–282, 484–485, 496–497, 501, 359/625, 638, 640, 577, 580, 586, 618, 629; 356/364; 349/122, 5, 7–9, 25; 348/739, 744, 348/750, 751, 756, 757, 759
See application file for complete search history.

(56) References Cited

U.S. PATENT DOCUMENTS

| | | | |
|---|---|---|---|
| 6,190,014 B1 * | 2/2001 | Kusano et al. | 353/81 |
| 6,786,604 B2 * | 9/2004 | Aastuen et al. | 353/20 |
| 2002/0097382 A1 * | 7/2002 | Suzuki et al. | 353/31 |

FOREIGN PATENT DOCUMENTS

| | | |
|---|---|---|
| JP | 09-054213 | 2/1997 |
| JP | 2002-228809 | 8/2002 |

* cited by examiner

*Primary Examiner*—Judy Nguyen
*Assistant Examiner*—Rochelle Blackman
(74) *Attorney, Agent, or Firm*—Jacobson Holman PLLC (57) ABSTRACT

A color-separating and -recombining optical system provided between a light source and a projection lens in a projection display, has at least one prism assembly made up of at least two prisms bonded to each other with a bonding layer formed between the prisms. A white light emitted from the light source is divided into red-, green-, and blue-color light components related to primary colors. The light components are modulated by spatial light modulators in accordance with a video signal. The modulated light components are combined and projected onto a screen via the projection lens. The thickness of the bonding layer is varied as thin and thick for optical paths long and short, respectively, from the spatial light modulators to the bonding layer which each modulated light component emitted from the corresponding spatial light modulator reaches.

15 Claims, 6 Drawing Sheets

COLOR-SEPARATING AND -RECOMBINING OPTICAL SYSTEM

BACKGROUND OF THE INVENTION

The present invention relates a color-separating and -recombining optical system having several prism assemblies each made up of prisms bonded to each other with an optical adhesive and being applicable to a projection display having spatial light modulators.

Color projection displays operate as follows: White light is separated into three primary colors R (Red), G (Green) and B (blue). The separated color components are guided to the corresponding spatial light modulators (abbreviated to SLM hereinafter) for optical modulation in accordance with a video signal. The modulated color components are recombined and projected onto a screen, thus a color image being displayed thereon.

Color projection displays are classified into three types in accordance with SLMs to be used, such as, a type with transparent SLMs, another with reflective SLMs, and still another with a DMD (Digital Mirror Device).

Compact transparent SLMs and DMDs are available for their relatively simple optical architecture but have difficulty in resolution.

On the contrary, reflective SLMs exhibit high resolution but pose a problem in compactness due to complex optical system using this type of SLMs. Particularly, projection displays equipped with reflective SLMs require polarization beam splitters (abbreviated to PBS hereinafter) for splitting light beams incident into the SLMs and reflected light beams that have been modulated by the SLMs. In detail, each reflective SLM requires two or more of PBSs for high contrast, thus resulting in complex optical architecture for reflective projection displays.

A compact color-separating and -recombining optical system with no such problems on optical architecture of reflective SLMs is disclosed, for example, in Japanese Unexamined Patent Publication No. 2002-228809.

Nonetheless, projection displays equipped with such a compact color-separating and -recombining optical system suffer low contrast at the corners of a black image on screen due to birefringence when a high-intensity discharge lamp of 100 W or more is used. The birefringence occurs when a known optical glass BK7 is used for the transparent material of PBSs.

In order to solve such a problem, Japanese-Unexamined Patent Publication No. 9-54213 discloses that a specific transparent material of small opto-elastic constant for PBSs causes small birefringence. It is taught that the specific transparent material of small opto-elastic constant is effective when used for a main PBS that splits a light beam incident into a reflective SML and another light beam modulated and reflected by the reflective SLM.

The refractive index Nd of optical adhesives is relatively low, for example, in the range from 1.45 to 1.6 for epoxy and ultraviolet-cured optical adhesives, mostly about 1.5.

A well-known optical glass, borosilicate glass, such as BK7, exhibits a refractive index of about 1.5.

In contrast, glass materials having small photoelastic constants are usually heavy materials containing a large amount of lead, such as optical flint, exhibiting high refractive indexes of about 1.85.

The difference in refractive index Nd between a borosilicate glass, such as BK7, and a bonding layer of optical adhesive is thus small in a prism assembly, and hence the existence of the bonding layer can be ignored for a light beam passing through the prism assembly.

On the contrary, the difference in refractive index Nd between a glass of a small photoelastic constant and a bonding layer of optical adhesive is large in a prism assembly. This large difference in refractive index causes wavefront aberration or error due to refraction of a light beam on the interface of the bonding layer, thus resulting in low resolution.

SUMMARY OF THE INVENTION

Under consideration of the problems discussed above, a purpose of the present invention is to provide a color-separating and -recombining optical system that offers high image quality with almost no wavefront aberration which may otherwise be caused due to refraction of a light beam on the interface of a bonding layer.

The present invention provides a color-separating and -recombining optical system comprising at least one prism assembly made up of at least two prisms bonded to each other with a bonding layer formed between the prisms, thickness of the bonding layer being varied depending on a length of each optical path of color light components incident into the optical system and reaching the bonding layer via one of the prisms.

Moreover, the present invention provides a color-separating and -recombining optical system provided between a light source and a projection lens in a projection display, having at least one prism assembly made up of at least two prisms bonded to each other with a bonding layer formed between the prisms, a white light emitted from the light source being divided into red-, green-, and blue-color light components related to primary colors, the light components being modulated by spatial light modulators in accordance with a video signal, the modulated light components being combined and projected onto a screen via the projection lens, thickness of the bonding layer being varied as thin and thick for optical paths long and short, respectively, from the spatial light modulators to the bonding layer which each modulated light component emitted from the corresponding spatial light modulator reaches.

Furthermore, the present invention provides a projection display comprising: a light source for emitting a white light; a polarization plate, specific linearly-polarized lights of red-, green-, and blue-color light components related to primary colors of the white light only passing through the polarization plate; a color-separating and -recombining optical system having first to fourth optical components having polarization-splitting planes intersecting each other like a character-"X", wavelength-selective polarizing converters for rotating the plane of polarization of the red-, green-, and blue-color light components by 90 degrees, one of the converters being placed at a light-incident side of the first optical component, another of the converters being placed at a light-emitting side of the fourth optical component, the first and the fourth optical components being provided at a light-incident side and a light-emitting side, respectively, of the optical system, the first and the fourth optical components being arranged as diagonally opposing each other, and the remaining converters being placed between at least two inner facing planes of the first to the fourth optical components; first, second and third spatial light modulators, the first modulator being provided in front of a light-emitting side of the second optical component, the second and third modulators being provided in front of light-emitting sides of the third optical component; and a projection lens provided at the light-emitting side of the optical system, via which an output light beam from the optical system is projected onto a screen, wherein at least the fourth optical component provided at the light-emitting side of the optical system is a prism assembly made up of at least two prisms bonded to each other with a bonding layer formed between the prisms, thickness of the bonding layer being varied as thin and thick for optical paths long and short, respectively, from the spatial light modulators to the bonding layer which each modulated light component emitted from the corresponding spatial light modulator reaches.

DETAILED DESCRIPTION OF PREFERRED EMBODIMENT

A preferred embodiment according to the present invention will be disclosed with reference to the attached drawings.

Figure 1:
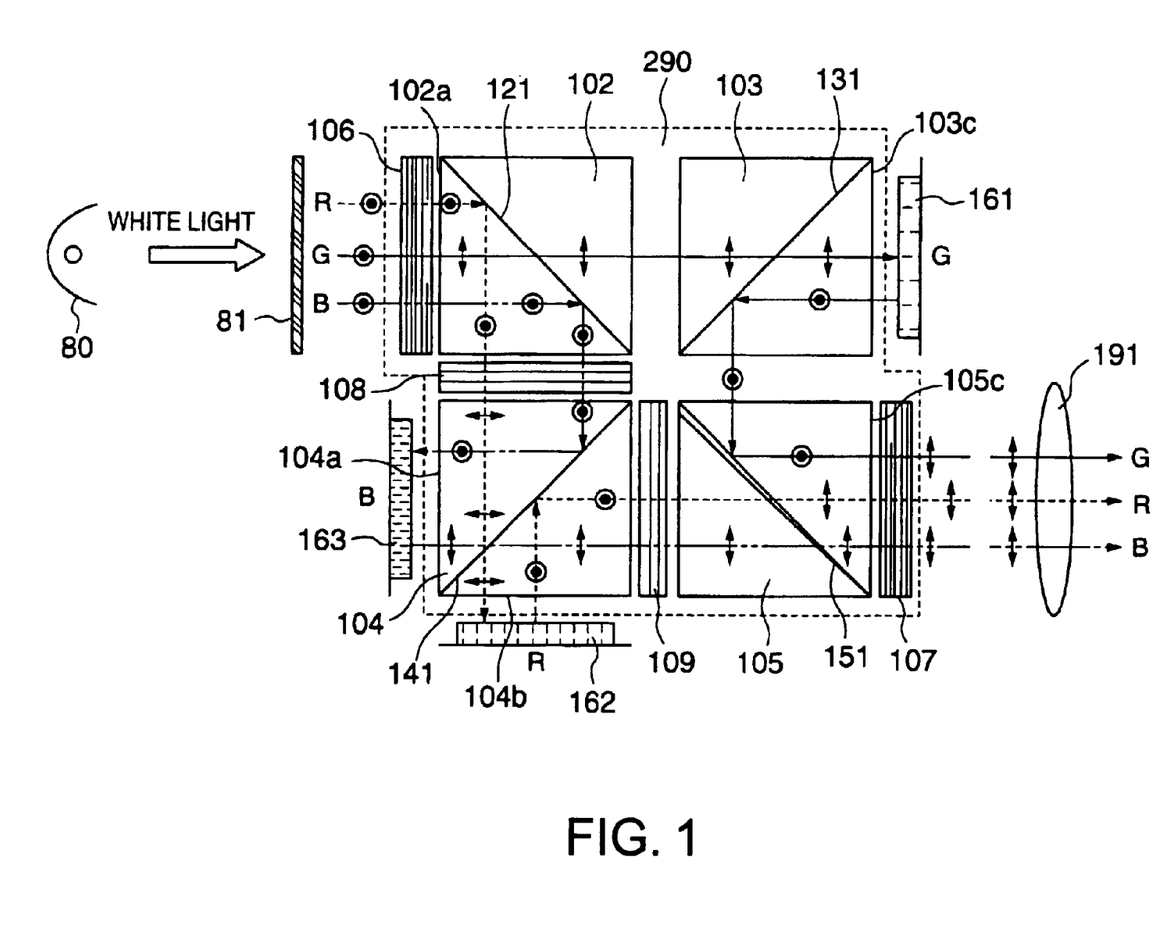
FIG. 1 is a schematic plan view of an embodiment of a color-separating and -recombining optical system according to the present invention.

FIG. 1 is a schematic plan view of an embodiment of a color-separating and -recombining optical system according to the present invention, with illustration of optical paths.

Surrounded by a dot line in FIG. 1 is a color-separating and -recombining optical system (abbreviated to CSR hereinafter) 290.

The CSR 290 has cubic- or square column-like first to fourth polarization beam splitters (abbreviated to PBS hereinafter) 102, 103, 104 and 105 arranged such that polarization-splitting planes 121, 131, 141 and 151 intersect each other almost like the character "X".

Provided in front of a light-passing plane (the light-incident plane side) of the first PBS 102 is a G (green)color polarization filer 106 for rotating the plane of polarization of G-light component by 90 degrees.

Provided in front of a light-passing plane (the light-emitting plane side) of the fourth PBS 105 is another G-color polarization filer 107 for rotating the plane of polarization of G-light component by 90 degrees.

Provided between the first and third PBSs 102 and 104 is a R (red)-color polarization filer 108 for rotating the plane of polarization of R-light component by 90 degrees.

Provided between the third and fourth PBSs 104 and 105 is another R-color polarization filer 109 for rotating the plane of polarization of R-light component by 90 degrees.

In operation, an unpolarized white light emitted from a light source 80 is incident into a polarization plate 81 provided in front of the G-color polarization filer 106.

An S-polarized light of the white light only passes through the polarization plate 81 and incident into the G-color polarization filer 106.

The G-color polarization filer 106 is a wavelength-selective polarizing converter for rotating only the plane of polarization of a G-light component by 90 degrees. Therefore, an S-polarized light component of a G-light component (solid line) only is converted into a P-polarized light among S-polarized light components incident into the G-color polarization filer 106. The remaining S-polarized light components for R-light component (one-dot dashed line) and B (blue)-light component (two-dot dashed line) are not converted and just pass through the G-color polarization filer 106.

The transition of light path and plane of polarization will be explained for each of the R-, G- and B-light components.

Explained first is the G-light component that has passed through the G-color polarization filer 106.

The G-light component (solid line) has been converted into the P-polarized light as described above. The G-light component passes through the polarization-splitting planes 121 and 131 of the first and second PBSs 102 and 103, respectively. The G-light component is emitted from a light-passing plane 103c of the second PBS 103 and incident into a reflective spatial light modulator (SLM) 161 for light modulation in accordance with a video signal corresponding to the G-light component. The modulated G-light component returns to the polarization-splitting plane 131 of the second PBS 103.

An S-polarized light generated for the G-light component due to light modulation is reflected at the third polarization-splitting plane 131 of the second PBS 103 and incident into the fourth PBS 105. The G-light component (S-polarized light) is reflected at a polarization-splitting plane 151 of the fourth PBS 105 and emitted from a light-passing plane 105c of the fourth PBS 105. The emitted G-light component is incident into the G-color polarization filter 107 for rotating only the plane of polarization of the G-light component by 90 degrees. The S-polarized light of the G-light component is thus converted into a P-polarized light and emitted from the filter 107.

Explained next is the R-light component (one-dot dashed line).

The R-light component (S-polarized light) that has passed through the G-color polarization filter 106 is reflected at the polarization-splitting plane 121 of the first PBS 102. The reflected R-light component is incident into the R-color polarization filter 108 (wavelength-selective polarizing converter) for rotating only the plane of polarization of R-light component by 90 degrees. The S-polarized light of the R-light component is thus converted into a P-polarized light and emitted from the filter 108.

The R-light component (P-polarized light) is then incident into the third PBS 104 and passes through the polarization-splitting plane 141 of the third PBS 104. The G-light component is emitted from a light-passing plane 104b of the third PBS 104 and incident into a reflective spatial light modulator (SLM) 162 for light modulation in accordance with a video signal corresponding to the R-light component. The modulated R-light component returns to the polarization-splitting plane 141 of the third PBS 104.

An S-polarized light generated for the R-light component due to light modulation is reflected at the polarization-splitting plane 141 of the third PBS 104 and incident into the R-color polarization filter 109. The S-polarized light of the R-light component is thus converted into a P-polarized light and emitted from the filter 109.

The R-light component (P-polarized light) is then incident into the fourth PBS 105 and passes through the polarization-splitting plane 151 of the fourth PBS 105. The R-light component is emitted from a light-passing plane 105c of the fourth PBS 105 and incident into the G-color polarization filter 107.

The G-color polarization filter 107 does not function to convert the R-light component, thus the R-light component is emitted from the filter 107 as the P-polarized light.

Explained next is the B-light component (two-dot dashed line).

The B-light component (S-polarized light) that has passed through the G-color polarization filter 106 is reflected at the polarization-splitting plane 121 of the first PBS 102 and incident into the R-color polarization filter 108. The R-color polarization filter 108 does not function to convert the B-light component but the R-light component only, thus the B-light component is emitted from the filter 108 as the S-polarized light.

The B-light component (S-polarized light) is then incident into the third PBS 104 and is reflected at the polarization-splitting plane 141 of the third PBS 104. The B-light component is emitted from a light-passing plane 104a of the third PBS 104 and incident into a reflective spatial light modulator (SLM) 163 for light modulation in accordance with a video signal corresponding to the B-light component. The modulated B-light component returns to the polarization-splitting plane 141 of the third PBS 104.

A P-polarized light generated for the B-light component due to light modulation passes through the polarization-splitting plane 141 of the third PBS 104 and incident into the R-color polarization filter 109. The R-color polarization filter 109 does not function to convert the B-light component, thus the B-light component is emitted from the filter 109 as the P-polarized light.

The B-light component (P-polarized light) is incident into the fourth PBS 105 and passes through the polarization-splitting plane 151 of the fourth PBS 105 and emitted from the light-passing plane 105c of the fourth PBS 105. The B-light component is then incident into the G-color polarization filter 107.

The G-color polarization filter 107 does not function to convert the B-light component but the G-light component only, thus the B-light component is emitted from the filter 107 as the P-polarized light.

As explained, the R-, G- and B-light components are converted into the P-polarized lights at the plane of polarization and passes through a projection lens 191, thus an enlarged color image being displayed on a screen (not shown).

Figure 2:
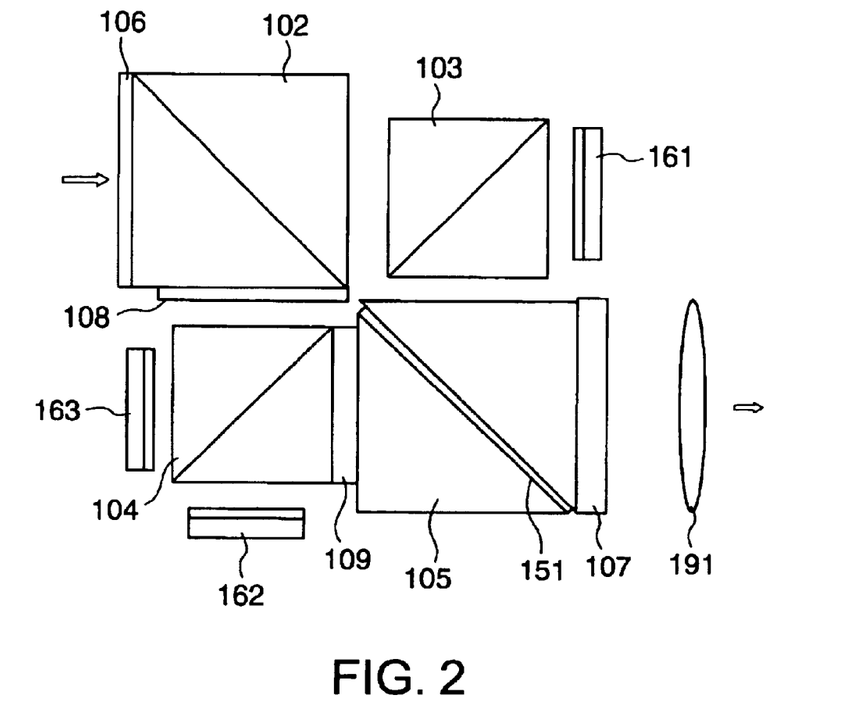
FIG. 2 is a schematic plan view illustrating a configuration of each prism assembly used in the embodiment of the color-separating and -recombining optical system according to the present invention.

Disclosed next with reference to FIG. 2 is a configuration of each prism assembly used in the embodiment of the color-separating and -recombining optical system according to the present invention. FIG. 2 corresponds to FIG. 1, but with no illustration of the optical paths.

As illustrated in FIG. 2, the color-recombining optical system is provided between the spatial light modulators (SLMs 161, 162 and 163) and the projection lens 191.

Simulation of resolution revealed that resolution is lowered as the optical components of the prism assemblies are closer to the projection lens 191, which depends on the surface accuracy and shape of the optical components.

The present invention is based on a new discovery in that resolution can be controlled by adjusting the thickness of a bonding layer formed between prisms of the prism assembly provided as closest to a projection lens. In detail, resolution is improved by making thin the thickness of the bonding layer when the optical path is long whereas thick when it is short. The optical path is the route for each modulated light emitted from the corresponding spatial light modulator to reach the bonding layer.

It is known that the tangential plane and the radial plane are defined in optical systems. The tangential plane contains the optical axis of a lens and an object point. Rays lied in this plane are called tangential rays. The radial plane is oriented perpendicular to the tangential plane and contains the principal ray that passes through the center of the lens as obliquely against the paraxial ray that is close to and nearly parallel with the optical axis of the lens. Rays lied in this plane are called radial rays.

A mismatch between a tangential image and a radial image produced by the tangential and radial planes, respectively, is called astigmatism. It is called curvature of image when each image is curved. The tangential image and the radial image are also called a meridional image and a sagittal image, respectively.

Modulation transfer Function (MTF) is a known method of quantitatively evaluating contrast and resolution. An MTF curve is obtained by measurements in both the radial and tangential directions. It is known that more similar MTF curves in the radial and tangential directions and MTF closer to 100% give high contrast and resolution, and MTF at 60% or higher gives sufficient image quality.

Discussed next in detail is the thickness of a bonding layer formed between prisms a prism assembly in accordance with MTF curves.

Figure 3:
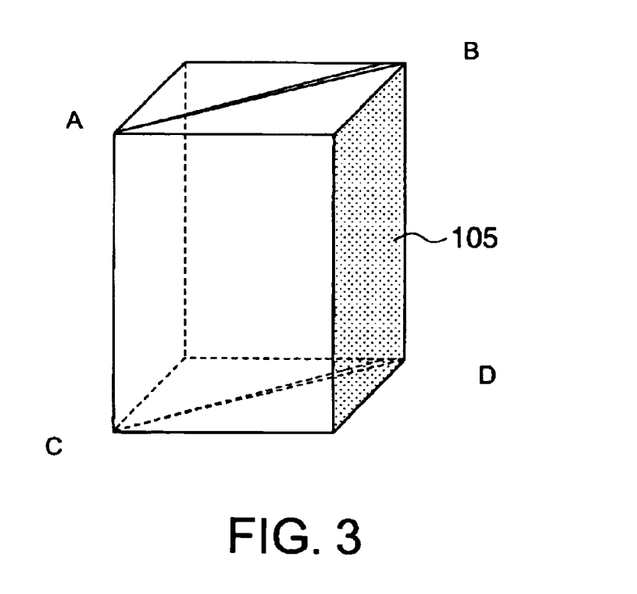
FIG. 3 is an illustration of the prism assembly provided as closest to a projection lens in the embodiment of the color-separating and -recombining optical system according to the present invention.

Illustrated in FIG. 3 is the prism assembly (PBS 105 in FIG. 2) provided as closest to the projection lens in the embodiment of the color-separating and -recombining optical system according to the present invention.

The signs "A", "B", "C" and "D" in FIG. 3 indicate thicknesses of a bonding layer at its four edges.

Simulation of resolution was performed under the following conditions using a color-separating and -recombining optical system with SXGA (1280×1024 pixels) reflective spatial light modulators (SLMs) having a 0.7-inch opposing corner.

(1) No difference in thickness, or flat over the bonding layer:

A: 7 $\mu$m, B: 7 $\mu$m, C: 7 $\mu$m, and D: 7 $\mu$m (2) Bonding layer thin and thick for optical paths long and short, respectively, from SLMs to the bonding layer which each modulated light emitted from the corresponding SLM reaches:

A: 10 $\infty$m, B: 5 $\mu$m, C: 10 $\mu$m, and D: 5 $\mu$m (3) Bonding layer thick and thin for optical paths long and short, respectively, from SLMs to the bonding layer which each modulated light emitted from the corresponding SLM reaches:

A: 5 μm, B: 10 μm, C: 5 μm, and D: 10 μm (4) No difference in thickness, or flat but thick over the bonding layer:

A: 15 μm, B: 15 μm, C: 15 μm, and D: 15 μm

The thicknesses listed above in the simulation of resolution were calculated for prisms made of PBH56 having a refractive index of 1.85 with an optical adhesive having a refractive index of 1.55.

Figure 4:
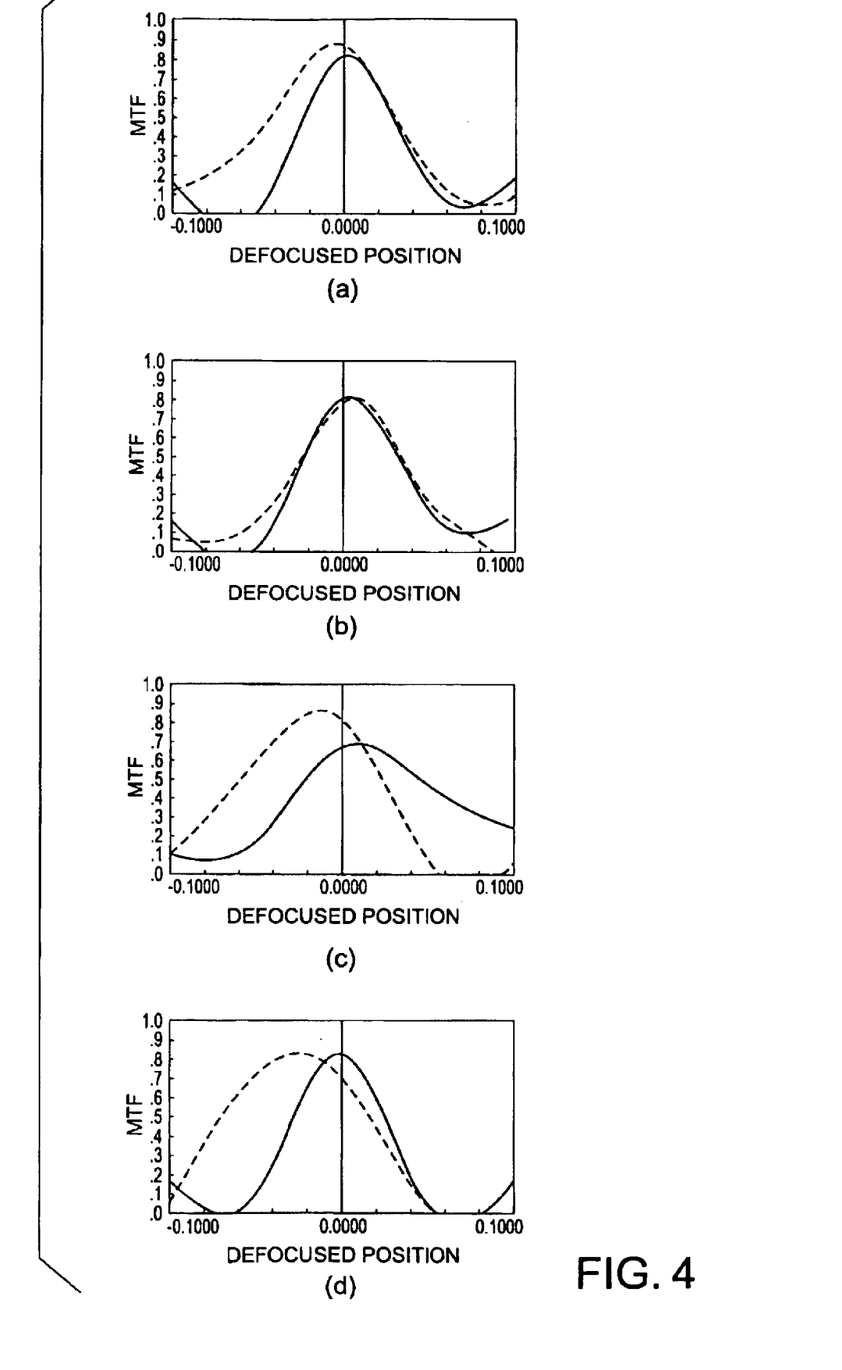
FIG. 4 shows MTF curves of the prism assembly provided as closest to the projection lens in the embodiment of the color-separating and -recombining optical system according to the present invention.

Results of the simulation are shown in FIG. 4. Curves shown in (a), (b), (c) and (d) of FIG. 4 were obtained under the conditions (1), (2), (3) and (4), respectively.

In FIG. 4, each curve indicates resolution MTF of an image at the center of a screen onto which the image was projected.

The axis of abscissas in (a), (b), (c) and (d) of FIG. 4 indicates defocused positions from the best focused position "0.0000" for an imaging device.

The axis of ordinate in FIG. 4 indicates MTF expressing the level of resolution, or MTF at 50 line pair/mm that is the borderline as to whether or not each pixel of an SXGA reflective spatial light modulator having a 0.7-inch opposing corner delivers resolution.

A solid-line curve and a dot-line curve indicate radial MTF and tangential MTF, respectively, in each graph of FIG. 4. The difference in peak of the radial- and tangential-MTF curves corresponds to astigmatism. The resolution becomes higher as the radial and tangential MTFs become larger but the difference in peak of the curves becomes smaller.

Results of the simulation in FIG. 4 are discussed.

The graphs in (a) and (b) of FIG. 4 show similar results, particularly, the radial- and tangential-MTF curves are very close to each other in (b).

The graph in (c) of FIG. 4 shows high astigmatism and hence low resolution. It is taught that low resolution is caused by a prism bonding layer formed as thick and thin for optical paths long and short, respectively, from spatial light modulators to the bonding layer which each modulated light emitted from the corresponding modulator reaches.

The graph in (d) of FIG. 4 with no difference in thickness, or flat but thick as 15 μm over the bonding layer shows higher astigmatism than that in (a), which teaches the thinner the average thickness of bonding layer, the higher the resolution.

It is concluded that high resolution is obtained by forming a bonding layer (of the prism assembly closest to a projection lens) as thin and thick for optical paths long and short, respectively, from spatial light modulators to the bonding layer which each modulated light emitted from the corresponding modulator reaches, according to the condition (2).

Discussed next is optimum thickness and difference in thickness for a bonding layer of a prism assembly.

Figure 5:
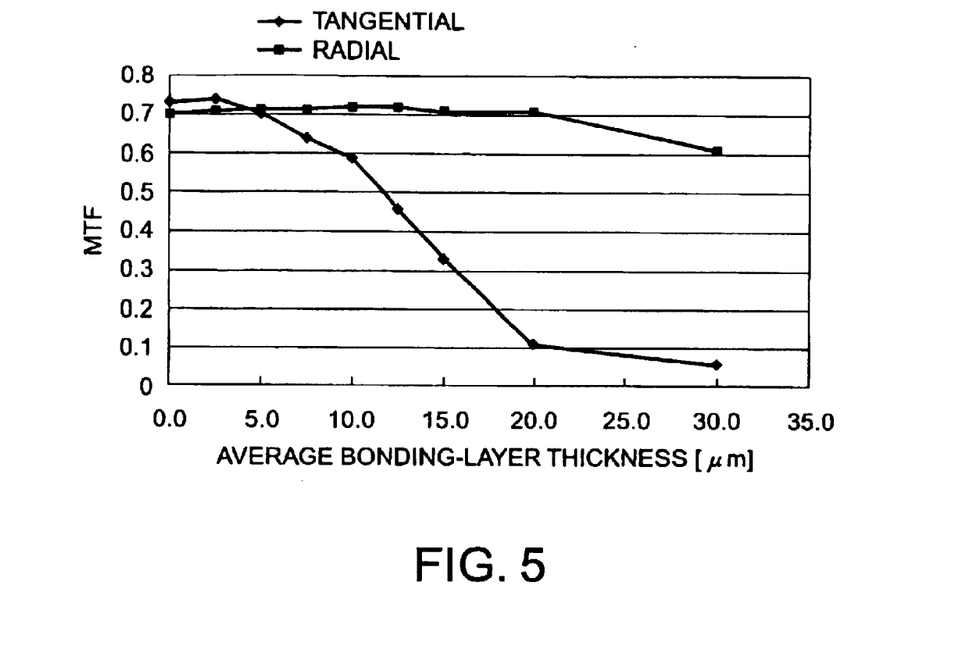
FIG. 5 shows MTF curves related to the thickness of a bonding layer of the prism assembly provided as closest to the projection lens in the embodiment of the color-separating and -recombining optical system according to the present invention.

Shown in FIG. 5 are tangential and radial MTF curves with average bonding-layer thickness as a parameter, under the condition that a bonding layer is flat, or has no difference in thickness over the layer.

The MTF curves were obtained by focusing an image to gain a maximum radial MTF in each bonding-layer thickness.

The MTF curves shown in FIG. 5 teach the following: The tangential MTF decreases as the average bonding-layer thickness increases. A preferable average bonding-layer thickness is 10 μm or less at 10% or less for difference in the MTF curves. Almost no adverse effects are given in the range from 0 to 2.5 μm. At least 2.0 μm or more is the minimum requirement of the average bonding-layer thickness under consideration of reliability, such as, plane accuracy and thermal resistance, of a bonding layer in a polarization beam splitter.

Figure 6:
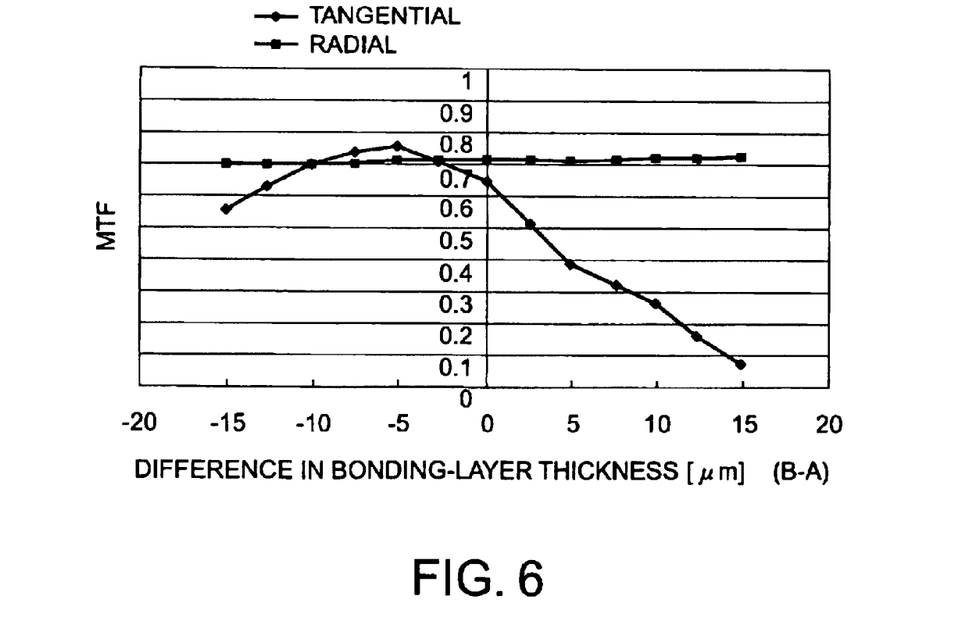
FIG. 6 shows MTF curves related to the difference in thickness of the bonding layer of the prism assembly provided as closest to the projection lens in the embodiment of the color-separating and -recombining optical system according to the present invention.

Other tangential and radial MTF curves shown in FIG. 6 were obtained with difference in bonding-layer thickness as a parameter. The difference is B−A or D−C when A=C and B=D in FIG. 3, with 7.5 μm in the center layer thickness.

The tangential MTF curve shown in FIG. 6 decreases when the difference in bonding-layer thickness B−A is positive, or under the condition (3) in which a bonding layer is formed as thick and thin for optical paths long and short, respectively, from spatial light modulators to the bonding layer which each modulated light emitted from the corresponding modulator reaches.

In contrast, the tangential MTF curve shown in FIG. 6 is fairly constant when the difference in bonding-layer thickness is negative, or under the condition (2) in which a bonding layer is formed thin and thick for optical paths long and short, respectively, from spatial light modulators to the bonding layer which each modulated light emitted from the corresponding modulator reaches.

FIG. 6 teaches that negative difference in boding-layer thickness gives higher resolution than positive difference.

The optimum difference in bonding-layer thickness B−A is −5 μm. The tangential MTF decreases when the difference goes beyond −5 μm, particularly, beyond −10 μm. The difference at −15 μm corresponds to the difference between the radian and tangential MTF curves at 10% or larger, which causes high astigmatism and low resolution.

The optimum range of difference in bonding-layer thickness is about from 0 to −12 μm to meet the requirement of the radial and tangential MTF curves preferably at 60% or more for high resolution of a projected image.

It has been found in this invention that the effects of difference in bonding-layer thickness to resolution becomes larger as the difference in refractive index between glass material for prisms and an optical adhesive becomes larger.

Figure 7:
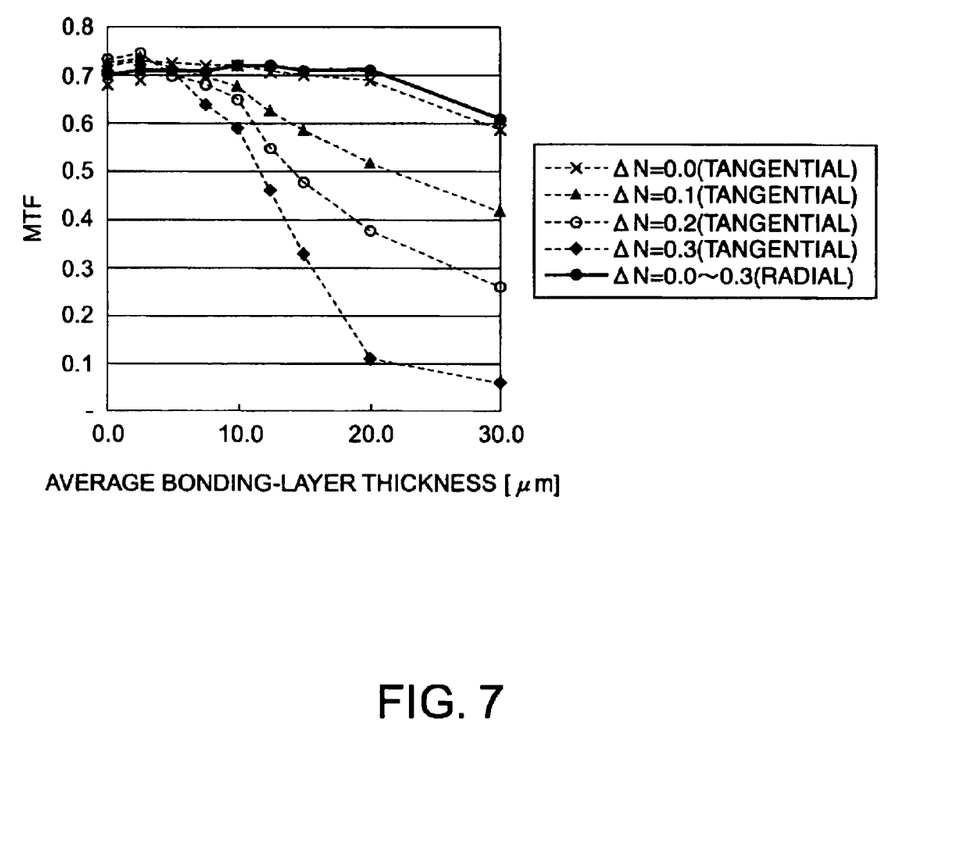
FIG. 7 shows tangential MTF curves, based on tangential rays when radial rays are best focused, versus average bonding-layer thickness with the difference in refractive index $\Delta N$ as a parameter.
Figure 8:
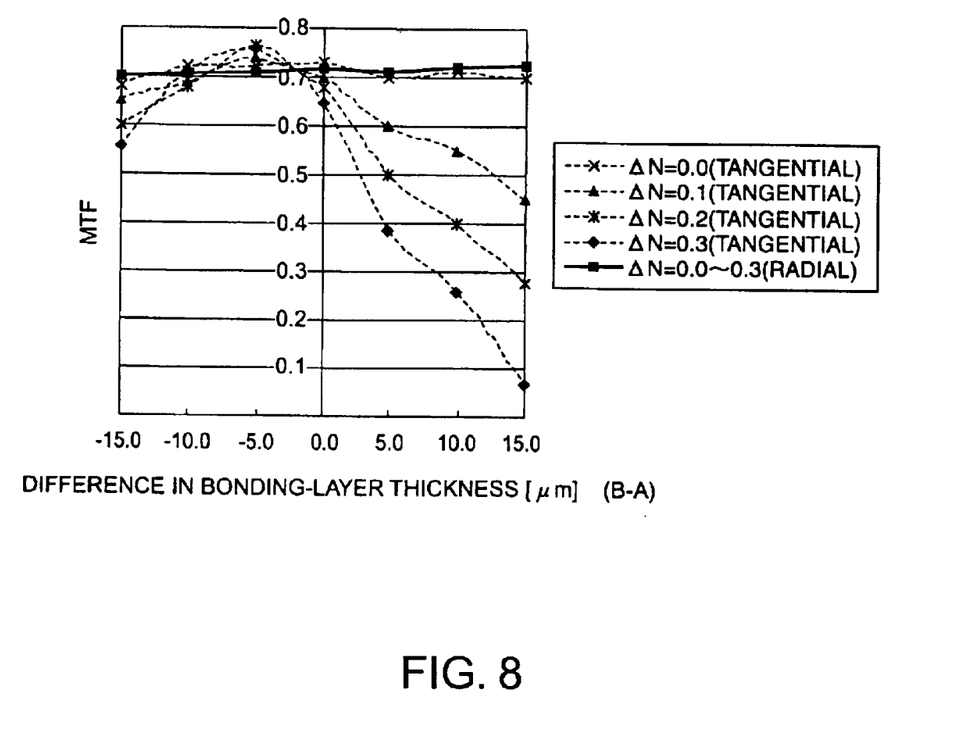
FIG. 8 shows MTF curves versus difference in bonding-layer thickness with the difference in refractive index $\Delta N$ as a parameter.

Shown in FIGS. 7 and 8 are simulated MTF curves with the refractive index Np of glass materials for prisms, the refractive index Na optical adhesives, and the difference in refractive index ΔN=Np−Na, as parameters.

FIG. 7 shows tangential MTF curves, based on tangential rays when radial rays are best focused, versus average bonding-layer thickness with the difference in refractive index ΔN as a parameter.

It is taught that, as the difference in refractive index ΔN becomes larger, the more average bonding-layer thickness affects resolution. A larger difference in refractive index ΔN requires a thinner bonding layer, preferably, 10 μm or less.

FIG. 8 shows MTF curves versus difference in bonding-layer thickness with the difference in refractive index ΔN as a parameter.

It is taught that negative differences in bonding-layer thickness (B−A or D−C when A=C and B=D in FIG. 3) achieve high resolution even at 0.1 in the difference in refractive index ΔN. In other words, preferable tangential and radial MTF curves are obtained by adjusting the difference in bonding-layer thickness to a negative side a little (about −5 μm at optimum) for a bonding layer of the prism assembly provided as closest to a projection lens.

The negative difference in bonding-layer thickness corresponds to the condition (2) in which the bonding layer is formed as thin and thick for optical paths long and short, respectively, from spatial light modulators to the bonding layer which each modulated light emitted from the corresponding modulator reaches.

The negative difference in bonding-layer thickness, or the condition (2) means that a bonding layer is thin at its one side (A or C side in FIG. 3) closer to a projection lens whereas thick at the opposite side (B or D side in FIG. 3) against the projection lens.

This adjustment to the difference in bonding-layer thickness achieves high resolution, particularly, at 0.3 or larger in the difference in refractive index ΔN.

The adjustment to the difference in bonding-layer thickness disclosed above is applicable not only to the prism assembly (polarization beam splitter) 105, shown in FIG. 2, provided as closest to the projection lens 191 but also those 103 and 104 next to the assembly 105, or each provided in front of the corresponding spatial light modulator, giving the same effects.

The foregoing disclosure is made for the color-separating and -recombining optical system with SXGA (1280×1024 pixels) reflective spatial light modulators having a 0.7-inch opposing corner. Nevertheless, the optimum bonding-layer thickness to meet the condition (2) discussed above for higher resolution depends on the type of spatial light modulators according to the present invention.

Discussed so far is the thickness of the bonding layer of the polarization beam splitter provided as closest to the projection lens. The adjustment to the bonding-layer thickness discussed above is also applicable to any polarization beam splitter provided in front of the corresponding spatial light modulator or to two or more of them.

Not only the color-separating and -recombining optical system equipped with reflective spatial light modulators disclosed so far, the adjustment to bonding-layer thickness under the condition (2) is applicable to other color-separating and -recombining optical systems equipped with, such as dichroic prisms, for achieving high resolution, against large difference in refractive index between the optical glass material and the bonding layer.

The adjustment to bonding-layer thickness under the condition (2) is further applicable to color-separating and -recombining optical systems equipped with dichroic prisms and also polarization beam splitters.

As disclosed in detail, the present invention provides a color-separating and -recombining optical system provided between a light source and a projection lens in a projection display, having at least one prism assembly made up of at least two prisms bonded to each other with a bonding layer formed between the prisms.

A white light emitted from the light source is divided into red-, green-, and blue-color light components related to primary colors. The light components are modulated by spatial light modulators in accordance with a video signal. The modulated light components are combined and projected onto a screen via the projection lens.

The thickness of the bonding layer is varied or adjusted as thin and thick for optical paths long and short, respectively, from the spatial light modulators to the bonding layer which each modulated light component emitted from the corresponding spatial light modulator reaches.

The adjustment to bonding-layer thickness offers high image quality with almost no wavefront aberration which may otherwise be caused due to refraction of a light beam on the interface of the bonding layer.

What is claimed is:

1. A color-separating and -recombining optical system comprising at least one prism assembly made up of at least two prisms bonded to each other with a bonding layer formed between the prisms, thickness of the bonding layer being varied depending on a length of each optical path of color light components incident into the optical system and reaching the bonding layer via one of the prisms, an average thickness of the bonding layer being in the range from 2 $\mu$m to 10 $\mu$m, a difference in thickness of the bonding layer between a thickest portion and a thinnest portion thereof being 12 $\mu$m or smaller.

2. The color-separating and -recombining optical system according to claim 1, wherein a difference in refractive index between the prisms and the bonding layer is 0.1 or larger.

3. The color-separating and -recombining optical system according to claim 2, wherein the difference in refractive index is 0.3 or larger.

4. A color-separating and -recombining optical system provided between a light source and a projection lens in a projection display, having at least one prism assembly made up of at least two prisms bonded to each other with a bonding layer formed between the prisms, a white light emitted from the light source being divided into red-, green-, and blue-color light components related to primary colors, the light components being modulated by spatial light modulators in accordance with a video signal, the modulated light components being combined and projected onto a screen via the projection lens, thickness of the bonding layer being varied as thin and thick for optical paths long and short, respectively, from the spatial light modulators to the bonding layer which each modulated light component emitted from the corresponding spatial light modulator reaches, an average thickness of the bonding layer being in the range from 2 $\mu$m to 10 $\mu$m, a difference in thickness of the bonding layer between a thickest portion and a thinnest portion thereof being 12 $\mu$m or smaller.

5. The color-separating and -recombining optical system according to claim 4 comprising a plurality of prism assemblies each made up of at least two prisms bonded to each other with a bonding layer formed between the prisms, thickness of the bonding layer of one of the prism assemblies, provided as closest to the projection lens in relation to other prism assemblies, being varied as thin and thick for optical paths long and short, respectively, from the spatial light modulators to the bonding layer which each modulated light component emitted from the corresponding spatial light modulator reaches.

6. The color-separating and -recombining optical system according to claim 4, wherein a difference in refractive index between the prisms and the bonding layer is 0.1 or larger.

7. The color-separating and -recombining optical system according to claim 6, wherein the difference in refractive index is 0.3 or larger.

8. A projection display comprising:
   a light source for emitting a white light;
   a polarization plate, specific linearly-polarized lights of red-, green-, and blue-color light components related to primary colors of the white light only passing through the polarization plate;
   a color-separating and -recombining optical system having first to fourth optical components having polarization-splitting planes intersecting each other like a character-"X", wavelength-selective polarizing converters for rotating the plane of polarization of the red-, green-, and blue-color light components by 90 degrees, one of the converters being placed at a light-incident side of the first optical component, another of the converters being placed at a light-emitting side of the fourth optical component, the first and the fourth optical components being provided at a light-incident side and a light-emitting side, respectively, of the optical system, the first and the fourth optical components being arranged as diagonally opposing each other, and the remaining converters being placed between at least two inner facing planes of the first to the fourth optical components;

first, second and third spatial light modulators, the first modulator being provided in front of a light-emitting side of the second optical component, the second and third modulators being provided in front of light-emitting sides of the third optical component; and a projection lens provided at the light-emitting side of the optical system, via which an output light beam from the optical system is projected onto a screen, wherein at least the fourth optical component provided at the light-emitting side of the optical system is a prism assembly made up of at least two prisms bonded to each other with a bonding layer formed between the prisms, thickness of the bonding layer being varied as thin and thick for optical paths long and short, respectively, from the spatial light modulators to the bonding layer which each modulated light component emitted from the corresponding spatial light modulator reaches, an average thickness of the bonding layer being in the range from 2 $\mu$m to 10 $\mu$m, a difference in thickness of the bonding layer between a thickest portion and a thinnest portion thereof being 12 $\mu$m or smaller.

9. The projection display according to claim 8, wherein at least one of the first, the second and the third optical components is a prism assembly made up of at least two prisms bonded to each other with a bonding layer formed between the prisms, thickness of the bonding layer being varied as thin and thick for optical paths long and short, respectively, from the spatial light modulators to the bonding layer which each modulated light component emitted from the corresponding spatial light modulator reaches.

10. The projection display according to claim 8, wherein a difference in refractive index between the prisms and the bonding layer is 0.1 or larger.

11. The color-separating and -recombining optical system according to claim 10, wherein the difference in refractive index is 0.3 or larger.

12. The projection display according to claim 8, wherein the spatial light modulators are reflective spatial light modulators.

13. The projection display according to claim 8, wherein the prisms are dichroic prisms.

14. The projection display according to claim 8, wherein the optical components are polarization beam splitters.

15. The projection display according to claim 8, wherein at least two of the optical components are a polarization beam splitter and a dichroic prism.

* * * * *